United States Patent [19]

Bar-David

[11] Patent Number: 5,570,364
[45] Date of Patent: Oct. 29, 1996

[54] CONTROL FOR MULTIMEDIA COMMUNICATION ON LOCAL ACCESS TABLE

[75] Inventor: Israel Bar-David, Haifa, Israel

[73] Assignee: Lucent Technologies Inc., Murray Hill, N.J.

[21] Appl. No.: 227,756

[22] Filed: Apr. 14, 1994

[51] Int. Cl.⁶ .................................................. H04J 3/16
[52] U.S. Cl. ........................ 370/79; 370/85.2; 370/85.6; 370/94.3; 340/825.02; 340/825.06
[58] Field of Search ...................... 370/94.3, 80, 95.3, 370/105.1, 85.12, 85.8, 85.4, 16.1, 85.5, 81, 77, 53, 58.1, 58.2, 58.3, 110.1, 79, 85.2, 85.3, 85.6, 85.7, 95.1, 95.2; 340/825.02, 825.06, 825.08, 825.54

[56] References Cited

U.S. PATENT DOCUMENTS

| | | | |
|---|---|---|---|
| 4,383,315 | 5/1983 | Torng | 370/85.5 |
| 4,809,362 | 2/1989 | Claus et al. | 370/94.3 |
| 5,109,379 | 4/1992 | Kume et al. | 370/94.3 |
| 5,172,374 | 12/1992 | De Cristofaris et al. | 370/94.3 |
| 5,341,374 | 8/1994 | Lewen et al. | 370/85.4 |
| 5,353,282 | 10/1994 | Dormer et al. | 370/94.3 |

FOREIGN PATENT DOCUMENTS

| | | |
|---|---|---|
| 0 155 773 | 2/1984 | European Pat. Off. . |
| 0 294 133 | 6/1987 | European Pat. Off. . |
| 0 444 207 | 9/1990 | European Pat. Off. . |

Primary Examiner—Alpus H. Hsu
Assistant Examiner—Ricky Ngo

[57] ABSTRACT

In a communication system, a network has nodes each connected in a star relationship to a number of end units that include a device for assuming one of an idle, active, or on-line state and for requesting the node to which it is connected to change it from the idle to the active and the active to the on-line state, and for releasing the on-line state on the basis of data at the end unit. The nodes for change the state of an end unit from the idle to the active and from the active to the on-line mode on the basis of available communication time. According to an embodiment of the invention, the nodes change the states to the on line state on the basis of policy preferences for the type of traffic, and specifically to grant priority to stream traffic over batch traffic.

18 Claims, 9 Drawing Sheets

AEU: ACTIVE END USER

FIG. 6

RESOURCES ALLOCATION

A. ORTHOGONAL CODEWORD TECHNIQUE

B. SPLIT CODEWORD TECHNIQUE (SLIGHT MODIFICATION OF RAMA)

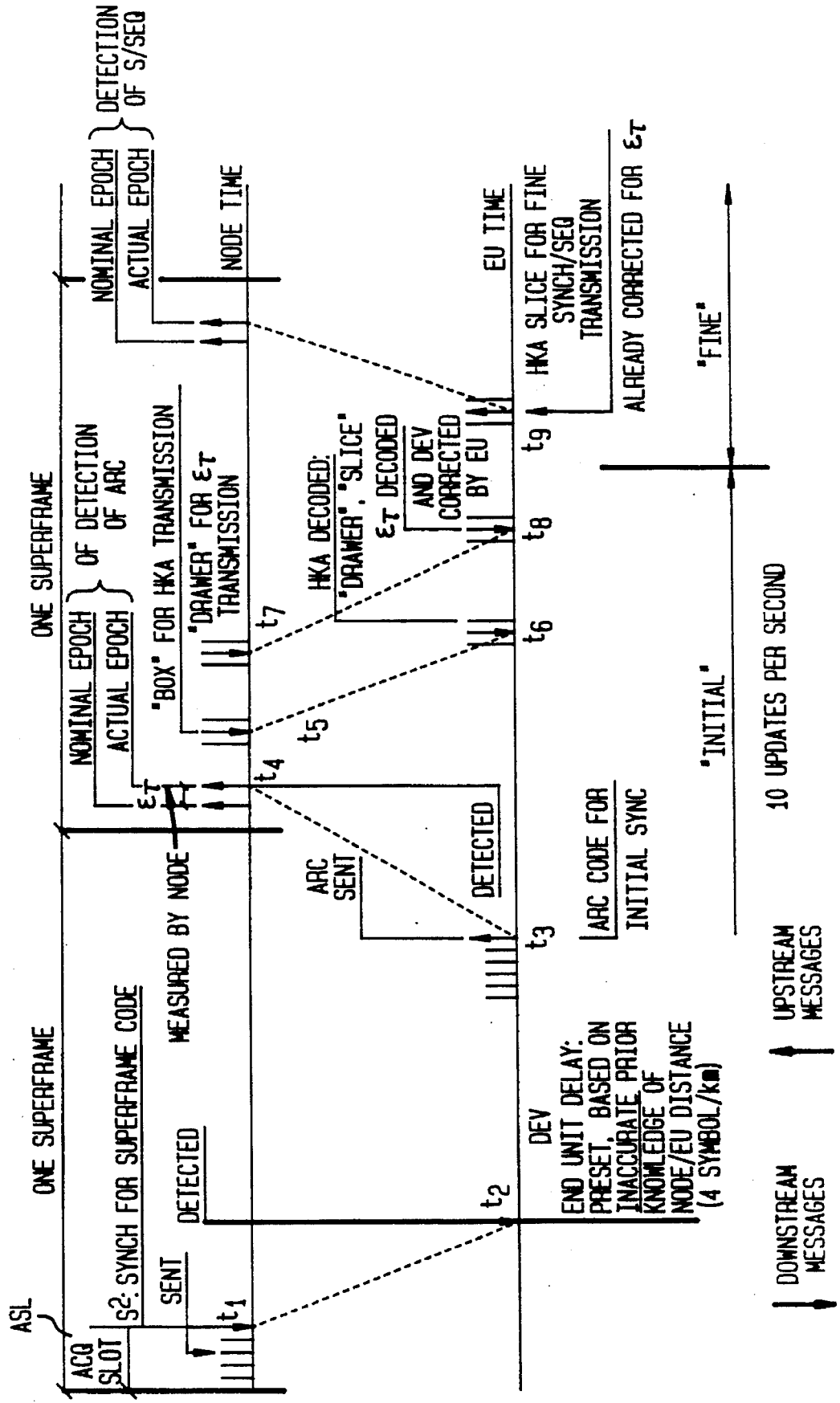

CONTROL FOR MULTIMEDIA COMMUNICATION ON LOCAL ACCESS TABLE

FIELD OF THE INVENTION

This invention relates to control methods and means for multimedia communication on local access cable, and particularly to architecture for communication in the upstream direction.

BACKGROUND OF THE INVENTION

A local access cable network contains nodes which diverge into a network of branching coaxial cables that terminate in end units. Amplifiers placed along the branches compensate for attenuation losses along the branches and for coupling losses at the junctions. The branching network resembles an upside-down tree with the node at the root. Upstream communication along the branches to the node represents more problems than the downstream communication for two reasons.

First, the node receiver at the root of the tree receives the sum of noise from all the amplifiers in the entire network as well as the sum of ingress noise at all end units. On the other hand the receiver at an end unit gets only the noise of the amplifiers along the particular path between itself and the node and from the local ingress noise. Due to this increased noise, in a given physical bandwidth, the upstream traffic is of necessity considerably slower than the downstream traffic.

Second, downstream communication represents only a multiplexing problem, whereas upstream communication constitutes a multiple access problem to a shared medium. Multiple access problems arise in various situations and many solutions have been proposed and several are in use.

An object of this invention is to maximize the throughput for any mix of traffic with arbitrary time varying rates in the upstream direction.

SUMMARY OF THE INVENTION

According to a feature of the invention, this object is attained by selectively placing the end units in one of an idle, active, or on-line state, on the basis of access requests by the end unit and responses by the node, and having the node accept data from the end units on a per frame, space available, and priority basis.

Another feature of the invention involves arranging the node and the end occurs units in a virtual star with dedicated virtual circuits to each end unit, storing upstream data in the end units.

According to another feature each of the end units and nodes contain processors with registers that store data. The nodes receive the contents of the end units, and allocate channel resources on a per frame basis so as not to leave any part of the time-bandwidth resource unused for any mix of traffic with arbitrarily time-varying rates.

The invention makes it possible to achieve practically 100% throughput for any mix of traffic. All the time-bandwidth resource may be allocated to any single unit, if so needed, or divided and distributed to as many voice users as allowed for by a chosen statistical multiplexing factor. This can be achieved with but a one-frame delay, which is 6 msec for the asynchronous transfer mode (ATM) format and thus tolerable for speech. The invention achieves low overhead for the critical upstream part of the network control. Indeed only a single bit per frame per active end unit is needed for this almost instantaneous (per frame) reallocation of channel resources.

The invention utilizes a three-state access technique and dual node/end-unit (NODE/EU) control of the network. Acquisition and synchronization occurs in the lowest, idle state, establishing a slow housekeeping link in the intermediary active state and transmitting traffic, on a rapid, per frame reconfiguration basis, in the on-line state. To maintain this regime and also provide for continuous diagnostics, intended to prevent mutual interferences over the multiply accessed upstream channel, a fine round trip symbol synchronization routine is also maintained, as part of the slow housekeeping function. The acquisition stage corrects any initial uncertainties up to hundreds of meters, in the round trip delay of the signals.

Data are usually organized in periodically repetitive frames and often superframes. The frames arrive at a sufficiently fast rate so as not to miss fine features in the information, such as nuances in speech. To achieve close to 100% efficiency in the use of the channel resources, a rapid controller allocates per frame the needed resources and recognize, again per frame, that some end-unit may release its allocation without causing any harm to the fidelity of its data. A mix of traffic exists in multimedia use. Voice, video and interactive games are not specified in duration, may not be interrupted, nor delayed, and have natural intermittencies, during which they should not be allocated resources. On the other hand, some data arrives in well-specified bulks such as files, orders, etc., which are allowed to be interrupted, delayed and then repackaged. (stored-and-forwarded).

Traffic rates in multimedia are orders of magnitude disparate in range. Voice is as low as 8 Kb/s while high-definition television (HDTV) needs about 20 Mb/s. "Statistical multiplexing" is a coinage for the technique of interlacing many voice (e.g.) sources, with the expectation that the active periods of some sources occur during the quiet periods of others, thus making more efficient use of resources. Since the mean activity factor of voice is about 30%, a multiplexing factor of 2.5 is considered reasonable when several tens of voice channels are statistically multiplexed.

Overhead for control is expensive because it consumes channel resources. The invention reduces overhead to about 1%. Low overhead for the upstream part of the control is important because, as pointed out, the upstream channel is noisier and therefore the transmission rate need be inherently smaller (by about one order of magnitude). A single bit (per frame per active end-unit) is the absolute minimum needed to convey anything. The invention allows the instant (per frame) reallocation of resources (item 1, above) with practically 100% (99%) throughput for any mix of traffic. This is a substantial improvement over that might need 20 bits and reduces the overall overhead from 12% to about 10%.

The distinction between the slow and rapid "housekeeping" control function is important for low overhead. In the slow function long messages can be transmitted, such as dial numbers, priorities, reservations, etc. for set-up purposes.

These are not overhead expensive because they are rare. On the other hand, the rapid reallocation messages that need be renewed up to thousand times per second are made short. According to the invention a minimal single-bit message serves for the rapid function.

The term "three-state access technique" is just a formal way to describe the organization of the "slow" and "rapid"

control messages. This distinction between slow and rapid, and the formalization of the three-state access concept results in the 1% overhead.

The invention uses a fine-(timing) synchronization routine for upstream traffic, adopted and modified from RADAR range-tracking techniques, to also indicate proper operation of the end units. The invention takes into consideration (i) the special tree-configuration with the node as a natural network controller and supervisor and (ii) the particular requirements and laxities of the contemplated traffic mix, such as voice, video, interactive fames, file transfer, data base requests, etc.

BRIEF DESCRIPTION OF THE DRAWINGS

FIG. 6 is a time diagram illustrating the time division of a frame during downstream communication.

FIG. 10 illustrates an initial and fine synchronization time chart for the system in FIGS. 2 to 9.

DETAILED DESCRIPTION OF PREFERRED EMBODIMENTS

Figure 1:
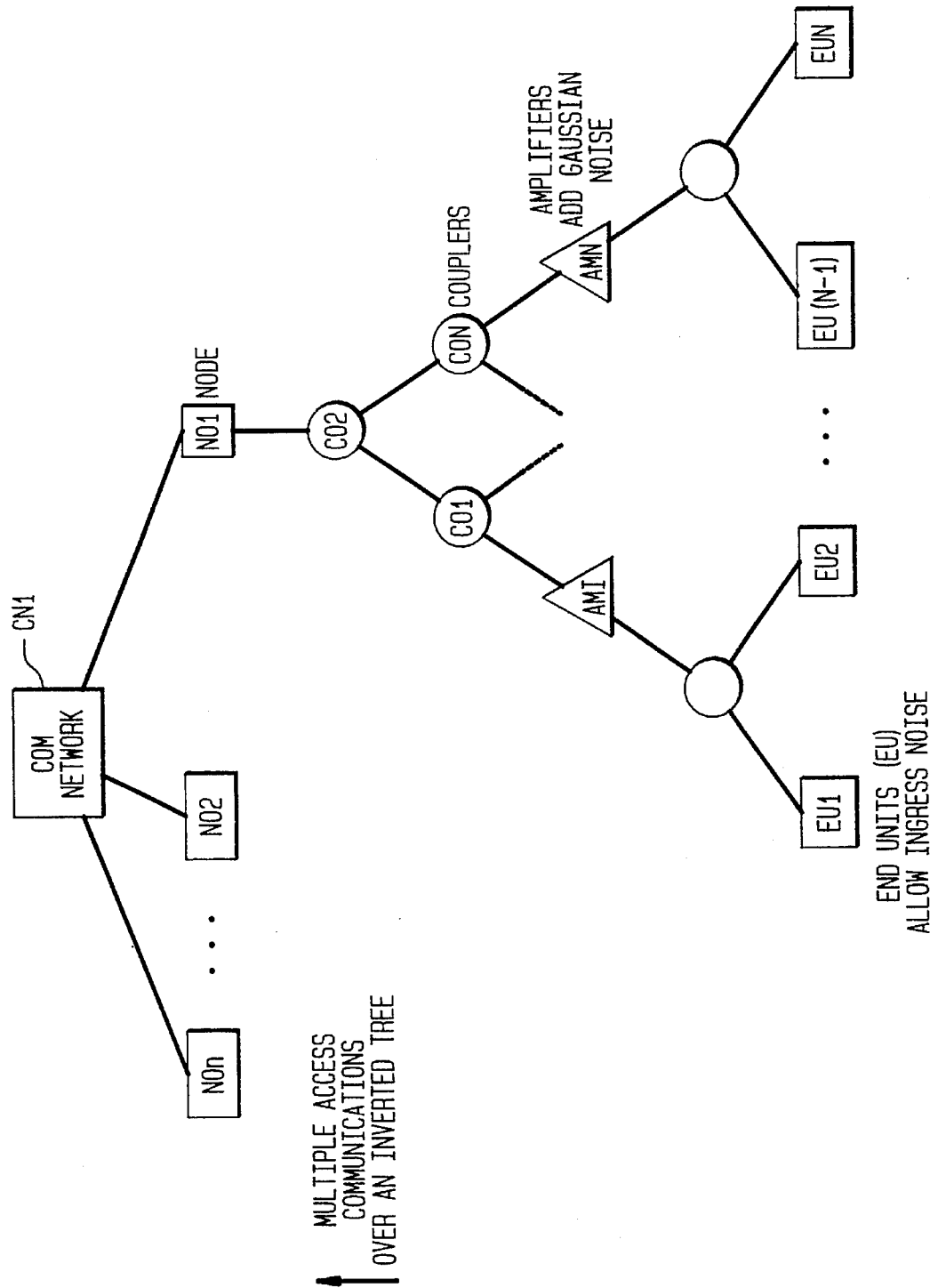
FIG. 1 is a schematic diagram of a local access system according to the prior art.

FIG. 1 illustrates a prior art local cable communication system. Here a node NO1 connects to a communication network CN1. The node NO1 transmits downstream messages to end units EU1 to EU(N-1) and EUN and receives upstream messages from the end units EU1 to EUN via couplers CO1 to CON and amplifiers AM1 to AMN. The amplifiers AM1 to AMN add Gaussian noise in both directions. This medium can be considered an inverted tree; the end-units (EU) connected at the tree top branches and the node at the root. Since the upstream channel is considerably noisier than the downstream, due to the tree structure which accumulates line-amplifier and ingress noise, the uplink traffic rate must be lower than the downlink rate.

Figure 2:
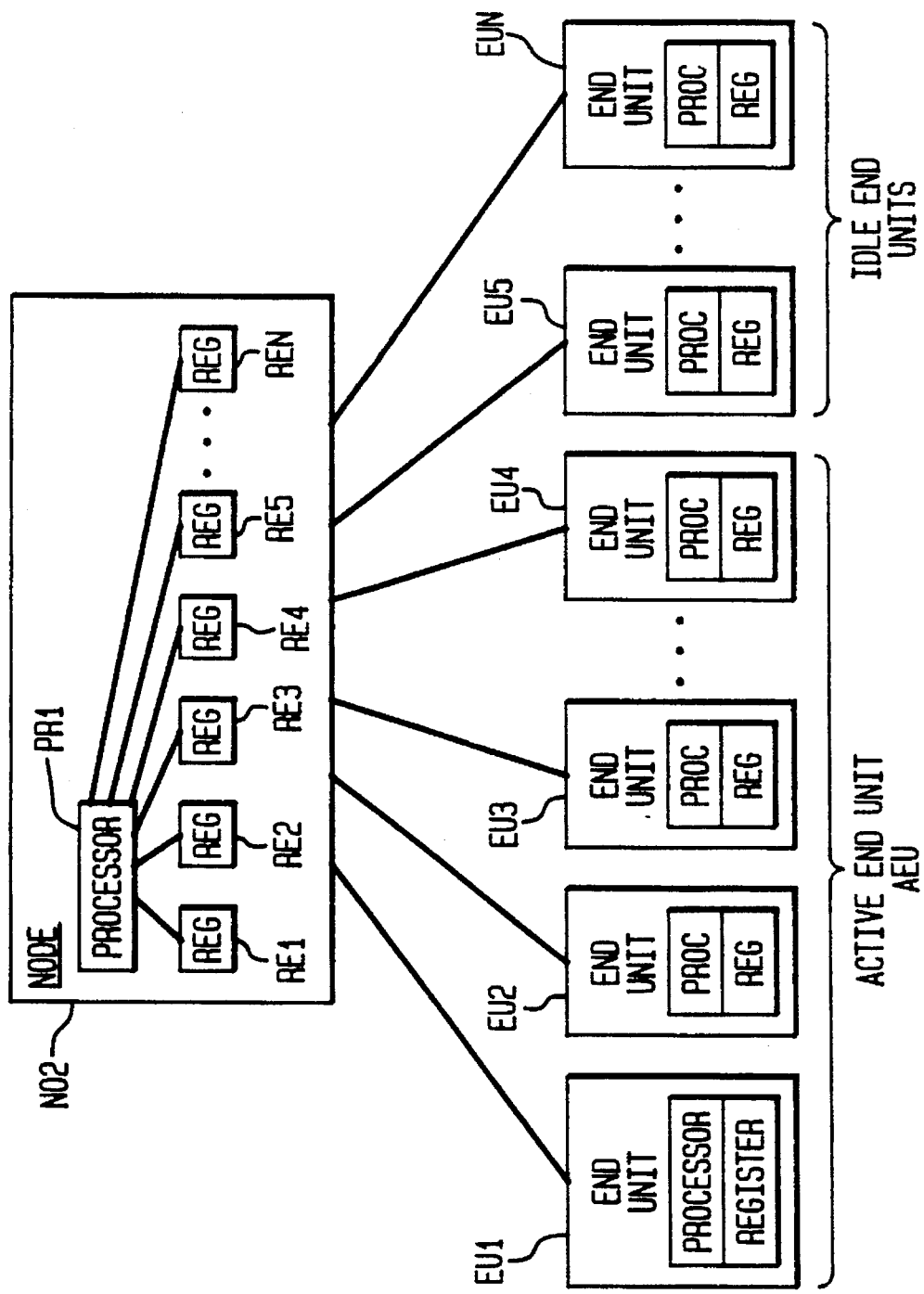
FIG. 2 is a schematic diagram of a local access system embodying features of the invention.

FIG. 2 illustrates a local cable communication system embodying the invention. This system replaces the tree structure of the local cable medium with a virtual star with dedicated virtual circuits to each end unit. In FIG. 2 a node NO1 contains a processor PR1 with registers RE1 to REN each dedicated to a respective end unit EU1 to EUN. Respective end units EU1 to EUN have respective processors PC1 to PCN with respective registers RR1 to RRN connected to the node NO1. The registers RE1 to REN and RR1 to RRN allow transfer of their contents of local registers RR1 to RRN to their respective counterparts RE1 to REN at the node using the same physical time bandwidth resource. The system uses a multiple access regime.

Each and unit EU1 to EUN has a local processor PC1 to PCN with a register RR1 to RRN and the node NO1 has as many registers RE1 to REN as needed to assign one to each active end unit AEU. The maximum number of active end units AEU is predetermined as a system parameter. All active end units AEU share the same physical channel bandwidth.

Figure 3:
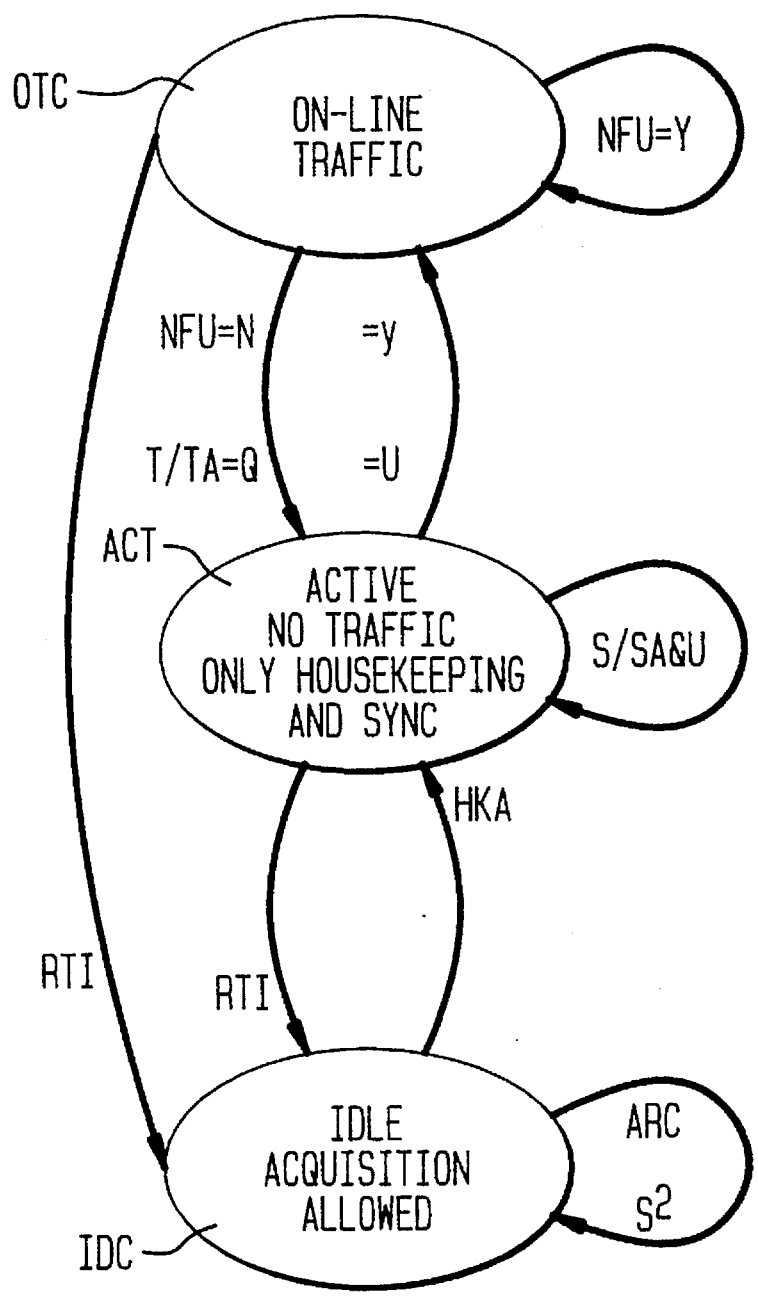
FIG. 3 is a diagram illustrating the various states and messages that an end unit assumes and delivers during operation.

FIGS. 3, 4, 5, and 6 illustrate the states and messages of the system. FIG. 3 shows the housekeeping function during an on line traffic condition OTC, during an active condition ACT when an end unit is not involved with traffic with only housekeeping and synchronization operation, and an idle condition IDC when the end unit can request acquisition and transfer to the active state. From the active state the node permits it to go on line or refuses access. The operation is in a slow mode of 1 to 10/sec or a fast mode of 0.1–1/msec. The operation is in accordance with the following table.

| Housekeeping | | |
|---|---|---|
| Next Frame Usage (NFU) = Yes/No | UP FAST | 1b/frame/AEU |
| Timing (Error) Traffic Allocation TTA = Use/Quit | DWN FAST | 12b/frame/AEU |
| Synchronization (Fine) Service Appl. & Update (S/SA&U) | UP SLOW | 20b/superframe/AEU |
| Access Granted & Housekeeping Allocation (HKA) | DWN SLOW | 800/sec (unnassigned TDM boxes) |
| Return to Idle (RTI Acquisition | DWN ONE-SHOT | (alternative T/TA) |
| Access Request Code (ARC) (also initial synch | UP ONE-SHOT | (in ACQ.SLOT) |
| Superframe Synchronization ($S^2$) | DWN SLOW1 | slot/superframe |

Messages are sent in boxes, drawers, slices, and tags, which are time intervals in the various fields of the downstream and upstream frame structure.

Figure 4:
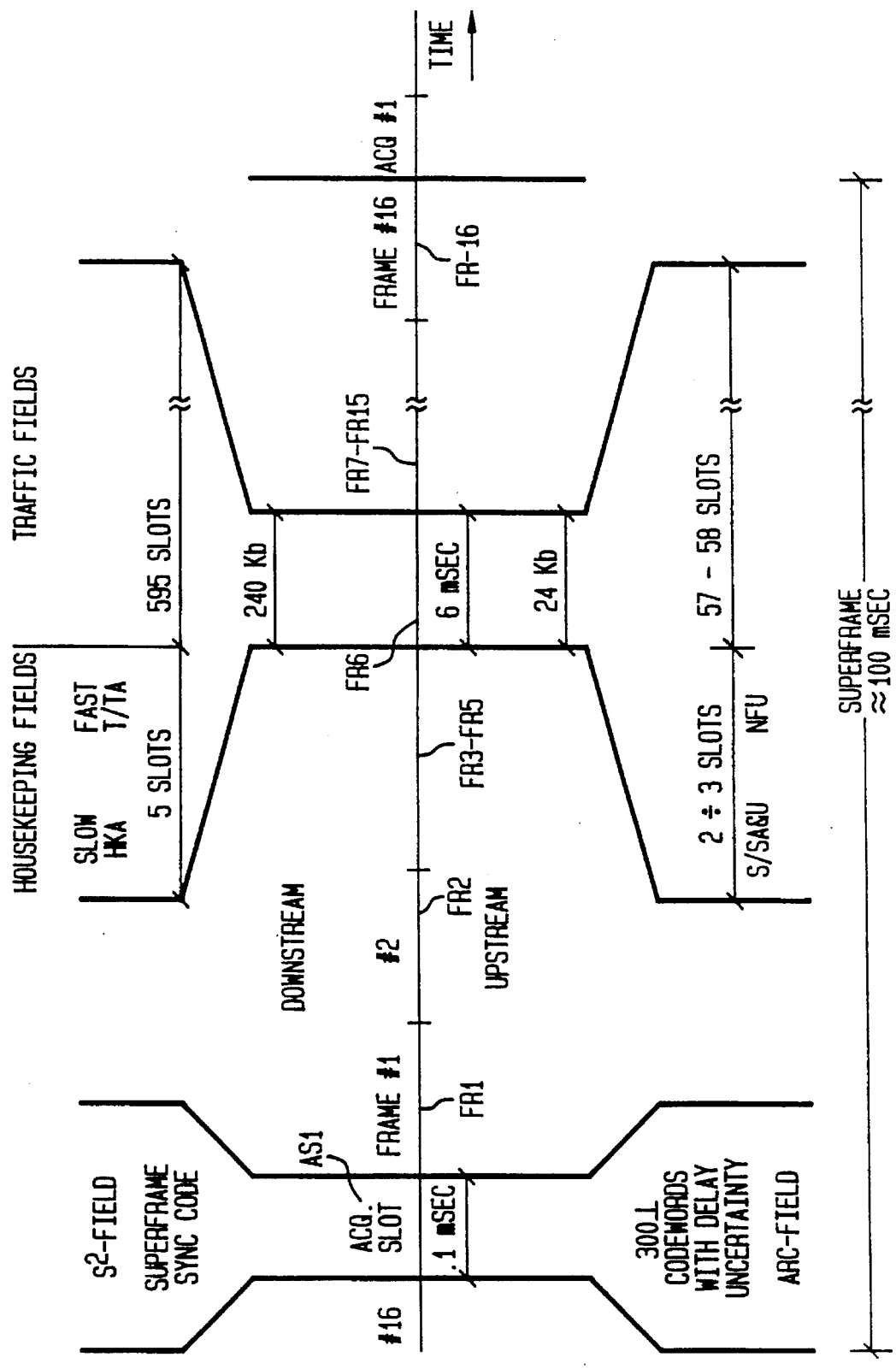
FIG. 4 is a time diagram illustrating the time division of a frame and superframe of time during upstream and downstream communication.

FIG. 4 illustrates a superframe of approximately 100msec containing 16 frames FR1 to FR16 and a 0.1 msec acquisition slot AS1. Upstream, the acquisition slot includes 300 orthogonal codewords with delay uncertainty and an ARC field. Downstream serves for superframe synchronization $S^2$ field with a superframe sync code. A frame FR6 is an example of each of the 16 frames FR1 to FR16. The frame FR1 contains 240 Kb in the downstream direction and 24 Kb in the upstream direction. Downstream the frame FR6 contains 600 slots, of which 5 are for housekeeping fields with slow and fast fields for housekeeping allocation HKA and time (error)/traffic allocation T/TA. In the 600 slots 500 are for traffic fields. Upstream the frame FR1 uses 2–3 slots for synchronization (fine) service application and update (S/SA&U) and next frame usage (NFU) controls, and 57 to 58 slots for traffic.

Figure 5:
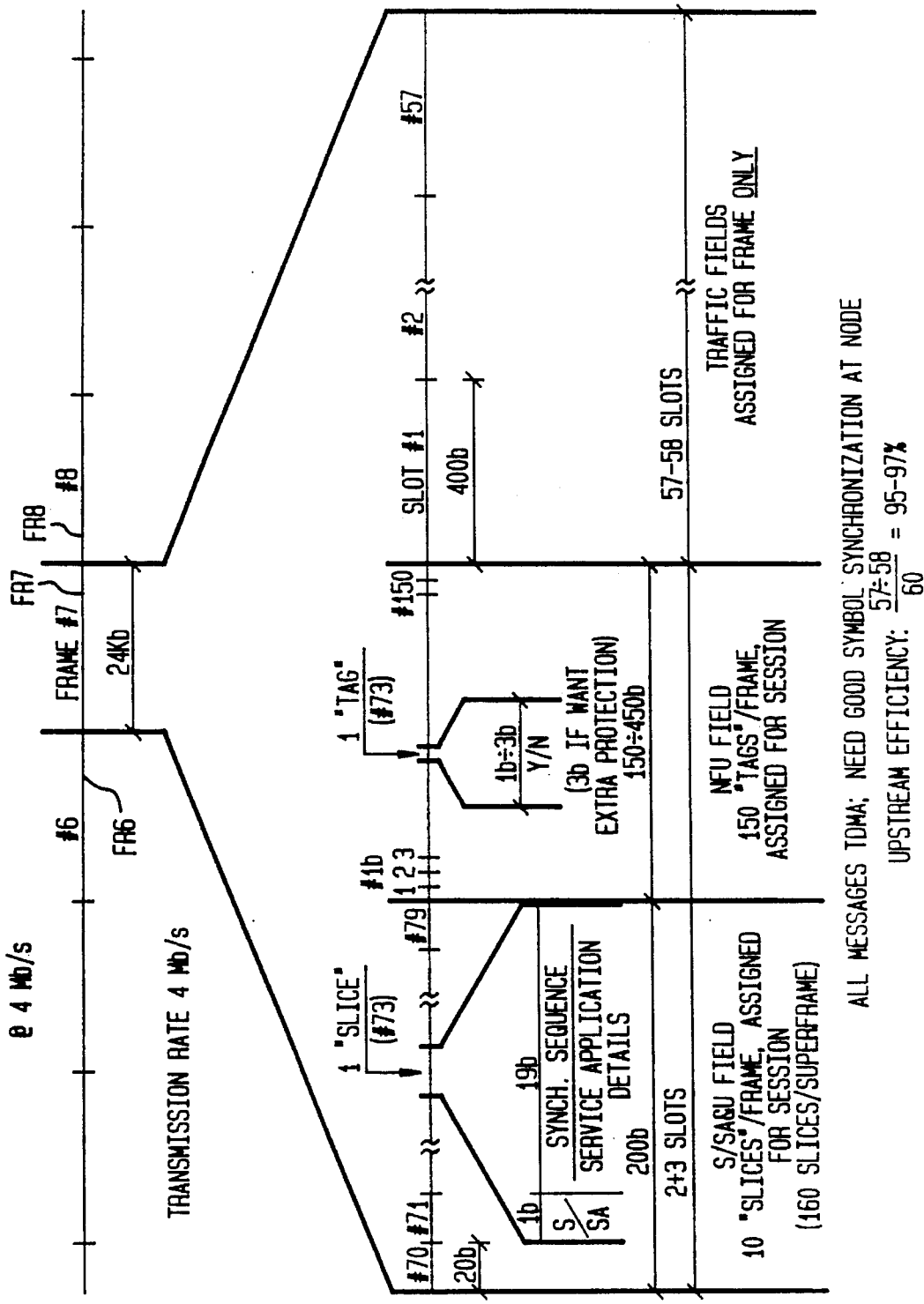
FIG. 5 is a time diagram illustrating the time division of a frame during upstream communication.

FIG. 5 illustrates upstream frame details of a frame FR7. The transmission rate is 4 Mb/s. The frame contains two to three slots divided into ten slices numbered 70 to 79. A sample slice 73 contains 20 bytes, one of which serves for synchronization service application S/SA and the other 19 of which serve for synchronization sequence service applications details. The two to three slots are 200 bytes wide and provide a synchronization service application and update S/SA&U field assigned for that session. There are 160 slices per superframe. Frame FR7 also contains a next frame usage (NFU) field with 150 tags per frame assigned for a session. The field is 150 to 450 bytes and each tag is 1 to 3 bytes. FIG. 5 shows 1 tag identified as No. 73.

The frame FR7 also contains traffic fields of 57 to 58 slots assigned for the frame only. All messages are TDMA and the system operates with an upstream efficiency of 57/60 to 58/60=to 95 to 97%.

Figure 6:
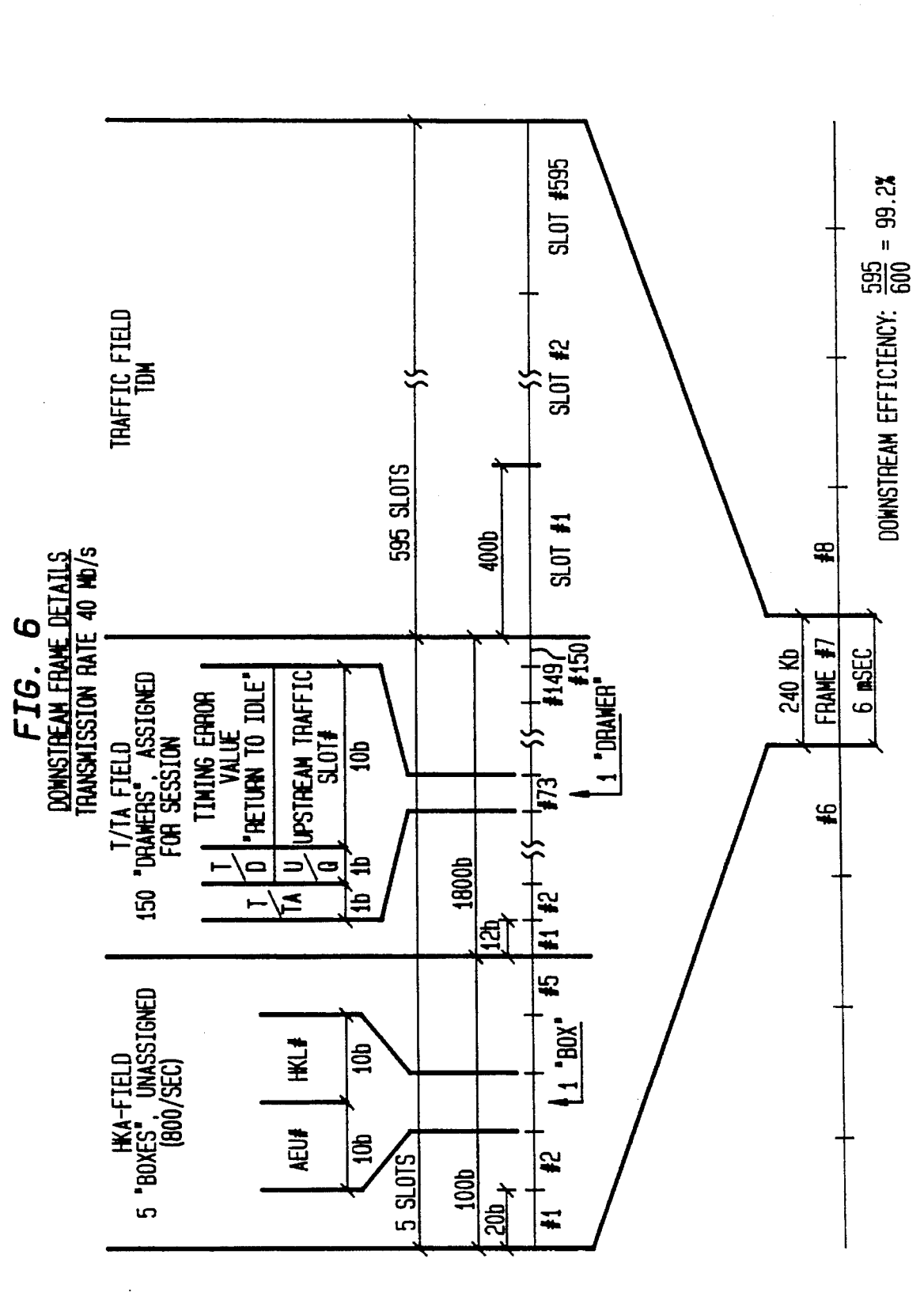

FIG. 6 illustrates the downstream frame details. Frame FR7 is 6 msec and long operates at 240 Kb. It contains a housekeeping field HKA of five unnassigned boxes 20 bits each with 10 bits for an active end unit AEU and 10 bytes for housekeeping. In the downstream frame part 2 a time/traffic allocation T/TA field includes 150 drawers assigned for the session with 12 bytes per drawer for a total of 1800 bytes. Each drawer uses 1 bit for time/traffic allocation, 1 bit for T/D and U, and Q, and 10 bits for return to idle and upstream traffic. The frame FR2 also includes 595 slots for a traffic field with 400 bits per slot. All messages are time division multiplexed and the system results in a downstream efficiency of 595/600=99.2%.

In FIG. 3 to 6, the idle state end units EU1 to EUN decode the messages of the superframe synchronization $S^2$ emitted once per superframe and estimate the epoch. End units EU1 to EUN are allowed to access the system in the first slot, i.e. the acquisition slot AS1, of the superframe by sending an acquisition request code ARC. The acquisition slot AS1 is broader than the acquisition request code ARC to eliminate uncertainty in an initial timing.

Upon detecting the acquisition request code ARC, the node NO2, on the basis of availability, allocates a housekeeping link HKL to an end unit EU1 to EUN by sending a house keeping access message HKA thus transforming it to an active end unit AEU, i.e. elevating it to the active state.

In the active state, the active end unit AEU may not yet transmit traffic but only use the housekeeping link to apply for service by sending an appropriate synchronization/service application and update (S/SA&U).

Upon decoding service application and update message SA&U (apart from a synchronization message S/), the node NO1 allocates the active end unit AEU one or more traffic slots by using the traffic allocation option TA of the timing error/traffic allocation message T/TA.

The node processor PR1 contains instructions indicating policy as to which form of messages have priority for traffic slots. For example, stream traffic such as voice, has priority over batch traffic such as file transfers. According to an embodiment the system gives preference to special users.

If the particular end unit is allocated traffic slots by transmission of T/TA=U (for use), the active end unit AEU goes on line and may use the allocated in all following frames by notifying the node using the one-bit next frame usage NFU=y in each frame. When the online active end unit AEU has exhausted the contents of its register it sends the next frame usage message NFU=n to release its online status but maintain its active status. This means that as soon as its register is again loaded it may immediately renew its previously negotiated traffic service by sending the next frame usage message NFU=y. The invention is arranged to produce a very high probability of honoring an active end unit's request of this type. Honoring such requests, depends upon priorities, costs, statistical multiplexing factors, etc.

According to an embodiment of the invention, the node exercises a prerogative to cancel part or all of its allocation on an online active end unit by sending an appropriated traffic allocation message T/TA=Q (for quit), thus relegating the active end unit to the active off-line state in which it is still entitled to the housekeeping link. The node may also send a return to idle message operation RTI as option T of the timing/traffic allocation message T/TA.

The example of quantitative data for the arrangement in FIGS. 3 to 6, involves modem rates downstream of 40 Mb/s, upstream 4 Mb/s. For voice traffic, there are 300 end units so that, M=300 with a penetration factor of ⅓. Thus, there are 100 active end units. At 4 Mb/s and 64 Kb/s voice circuits there are 60 voice circuits without statistical multiplexing. With a 2.5 statistical multiplexing factor there are a maximum number of possible voice circuits equal to 150 which is greater than 100.

With respect to the asynchronous transfer mode (ATM), there are 48 bytes per packet which is approximately equal to 400 bits per packet and voice with 64 Kb/sec. This results 6 msec/packet. For one voice packet per frame there are 6 msec/packet at 4 Mb/s. This results in 24 Kb/packet. Upstream this is 60 packets per frame and downstream 40 Mb/s or 600 packets per frame. The upstream initial synchronization is 300 m of delay uncertainty resulting in plus or minus microsecond at 4 Mb/s with plus or minus for symbols.

The processor PR1 in the node NO1 performs resource allocation on the basis of predetermined policy with the following steps. It keeps note of all stream and batch traffic requests. It keeps note of priorities of message types, or of end units on the basis of cost and/or grade of service. It decides when to grant access to a new end unit applying for active status. It decides when to grant online status an active end unit based on the statistical multiplexing factor and on traffic statistics. It notes the time and end unit spent in active and online states for billing at possibly different rates for the two states.

Figure 7:
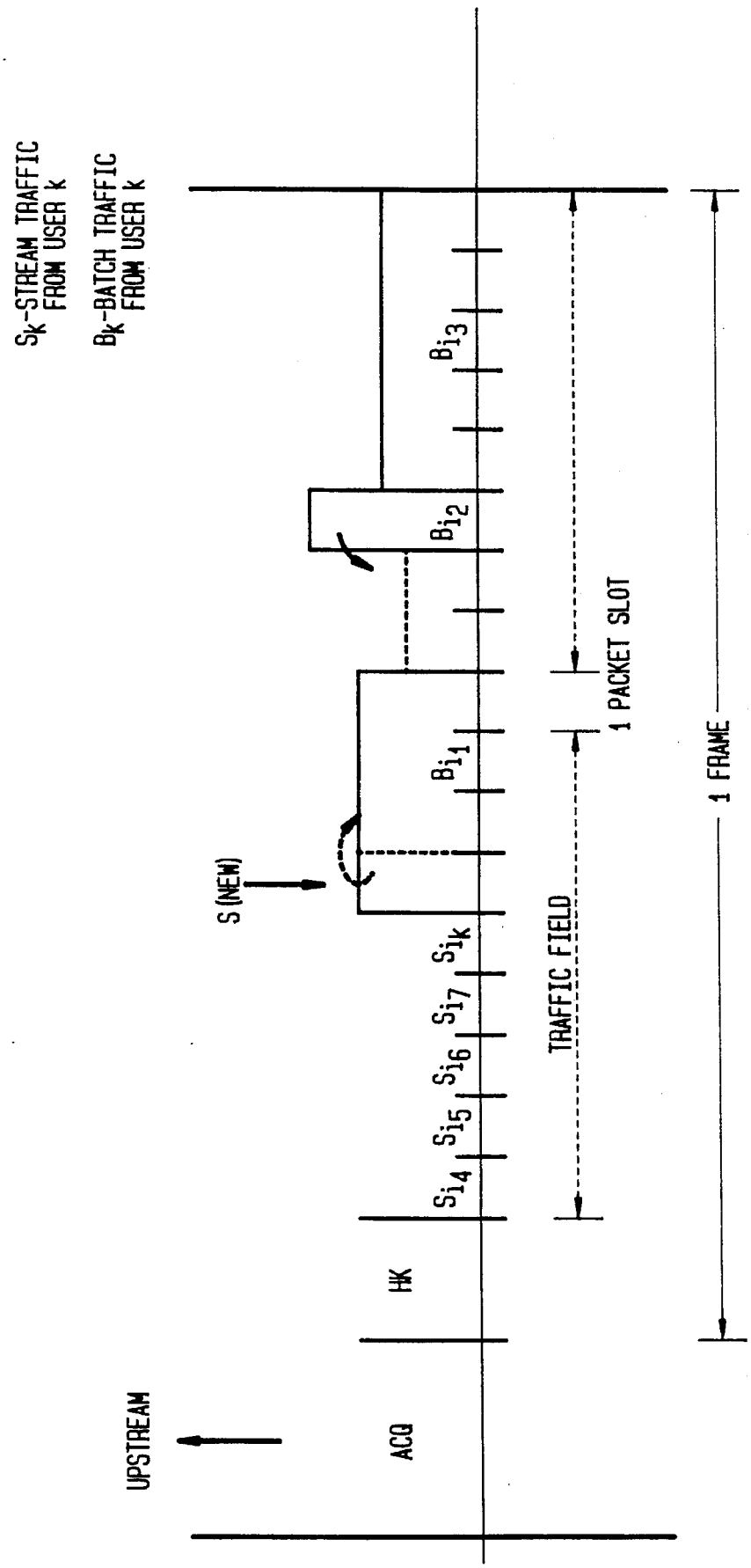
FIG. 7 is a time diagram of how resources are allocated for stream traffic and batch traffic on the basis of preference policy.

An illustration of the operation of the processor PR1 as it allocates resources appears in FIGS. 7 showing a sample exchange of housekeeping messages. It is preceded by acquisition ACQ. It starts with a housekeeping message followed by stream traffic $S_{i_4}$ to $S_{i_k}$ from users $i_4$ to $i_k$ and batch traffic $B_{i_1}$ to $B_{i_3}$ from users $i_1$, $i_2$, and $i_3$.

The area of batch type traffic indicates the batch size of the active end units register. Obviously for stream type traffic the size would have no meaning and respective slots are left open ended.

To the left of $B_{i_2}$, two slots have been emptied by say an interruption in voice, and the processor PR1 immediately allocates them to $B_{i_2}$. On the other hand a voice subchannel S(new) has been requested. It is assigned to the leftmost slot which is taken away from the batch of $B_{i_1}$. Here "immediate" means on the next frame. The following is sample exchange of messages of the algorithm. Fine synchronization messages are regarded in the following conversation.

UP: ARC: EU #18 CODEWORD

DN: HKA: (sent in first available empty box, which come at the rate of 800/sec): (EU) #18 (out of 300, you are activated, and are allocated a HKL, i.e. DRAWER, SLICE and TAG) #73 (out of 150)

UP: S/SA&U: (sent in SLICE #73, over as many superframes as needed): SA (i.e. service application message) VOICE(to) xx...x,(and) CONF. CALL(to) YY...Y, PRIORITY.

DN: T/TA: (Sent in DRAWER #73): TA, U, 38 (This is a traffic allocation message: Use slot #38 in next frame and the following frames, until you send NFU=N or until you are overruled by RTI (return to idle) message.)

UP: S/SA&U: (in SLICE #73): S, SYNCH SEQUENCE.

UP: NFU: (in TAG #73): Y,Y,Y,...Y,N. (Slot #38 is released but HKL #73 is maintained). Meanwhile Slot #38 has been assigned to some other AEU.

UP: NFU: (Y In TAG #73): Y (I need resource for same service as I applied for previously)

DN: T/TA: (in DRAWER #73): TA, U, 06 (Slot 06 is made available by NODE for continuation, or request is denied and user stays in active status)

UP: S/SA&U: (in SLICE #73): SA, CODEWORD FOR "HANG-UP". (session end).

DN: T/TA: (in DRAWER #73): T,D, "RETURN TO IDLE". (HKL #73 released) New request comes in

UP: ARC: EU #34 CODEWORD

DN: HKA: #34,#33 (HKL #33 allocated to EU #34)

UP: S/SA&U: (in SLICE 33) BATCHES, 154 packets to ZZ...Z. Node Consults Resources Allocation Algorithm:

DN: T/TA: (in DRAWER 33) TA, U, #45, 46, 47 New request comes in

UP: ARC: EU #18

DN: HKA: #18, #21

UP: S/SA&U: (in SLICE 21) Voice (to) HH...H. NODE consults Resources Allocation Algorithm and notes that a BATCH must be shrunk to accommodate new VOICE traffic):

DN: T/TA: (in Drawer 33): TA, Q (quit!slot) 45; (in Drawer 18): TA, U (use slot)

The node distinguishes between initial synchronization which is made sufficiently accurate to locate the end unit's EU1 to EUN transmission frame within 1 symbol-time approximately, and time synchronization to within less than a few percent of symbol time.

Initial Synchronization is performed simultaneously with acquisition, i.e. by means of the access request code (ARC), since the latter is the first transmission from an end unit EU1 to EUN and cannot, therefore have any synchronization whatsoever. The system uses the simplest code that performs both functions simultaneously namely a set of orthogonal codewords (OCW), one for each end unit, such as Hadamard. Alternatively it uses (rectangular) orthogonal square waves of staggered periods, that can be easily identified by means of FFT-type algorithms.

Using 1 bit/symbol, the number of symbols needed for M distinct signals is M, which would be prohibitive for a very large M but is not so in case of the disclosed system with M=300. Orthogonal signals are decoded individually by matched filtering and each timing is obtained by early-late gate techniques. According to another embodiment the system obtains them by search for the peak in the matched filter output.

Figure 8:
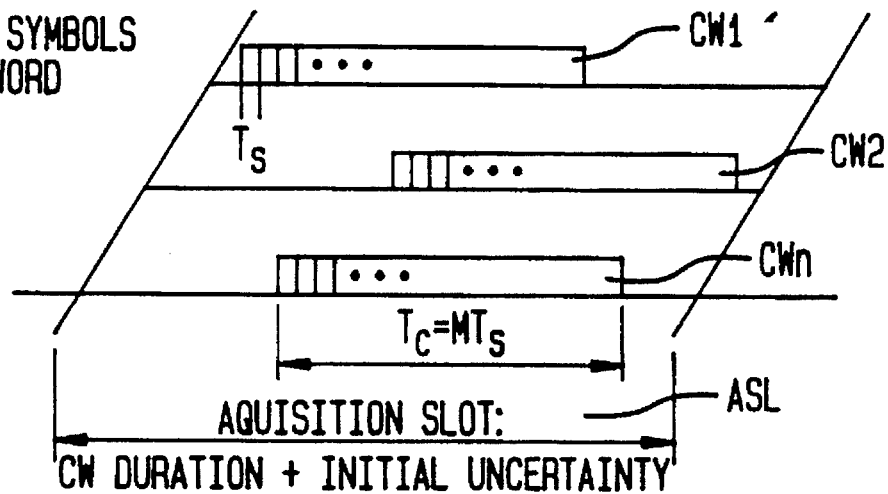
FIG. 8 illustrates an orthogonal codeword technique for acquisition and initial synchronization of time frames in the systems of FIGS. 2 to 7.

FIG. 8 illustrates the orthogonal codeword technique for acquisition and initial synchronization. Here an acquisition slot includes ASL includes codewords CW1, CW2, and CWn from various end units EU1, EU2 and EUN. Each codeword has a duration $T_c$ equal to M times $T_s$. The duration of the codewords CW1, CW2 ... CWN is equal to the codeword duration plus an initial uncertainty. This embodiment of the invention allows for a plus or minus two or three symbol uncertainty in the operation of fine synchronization. This requires only a slight increase in the housekeeping link. The high energy content and orthogonality make detection highly certain. A Cramer Rao type bound for the delay estimation error standard deviation the timing accuracy $\sigma_{96}$ for the worst codeword is $$\frac{T_c}{2} (E_c/N_o)^{-\frac{1}{2}},$$

where $T_c$ is the duration of the codeword, $E_c$ its energy and $N_o$ the noise power spectral density (assumed Gaussian, white). Therefore, since $T_c=MT_s$ and $E_c=ME_s$ the worst time accuracy is $$\frac{\sigma_\tau}{T_S} = (M/2)^{\frac{1}{2}} (E_S/N_o)^{-\frac{1}{2}}$$

Where M=300 $E_s/N_o \approx 100$ (20 dB) such that the residual error after the initial synch is $\sqrt{1.5}=1.2$ symbols.

According to an embodiment of the invention, the accuracy is improved by averaging over several codewords and by subsequent "fine" synchronization within a synchronization (fine)/service application and update message S/SA&U.

Figure 9:
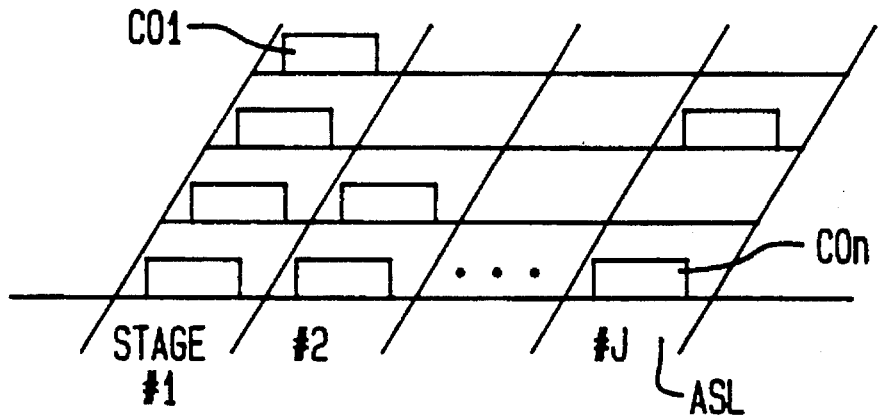
FIG. 9 illustrates another embodiment of the invention for acquisition and initial synchronization using a split codeword technique.

FIG. 9 illustrates another embodiment of the invention for acquisition and initial synchronization using a split codeword technique. Here, the acquisition slot ASL is divided into J stages. Codewords CO1 to CON appear in the slots. At all stages before the last, the node picks the winner and notifies downstream. Delays of several superframes may be needed when many end units make application for access. The node sends specific randomizing sequences to the end units. At the first stages several partial codewords may be identical but shifted. At the last stages, all are orthogonal and suitable for synchronization. The accuracy is $\sigma_\tau/T_s=K^{1/2} (E_s/N_o)^{-1/2} M^{[1/2(1-J)]}$, where each end unit is represented by J K-ary digits and M is smaller or equal to K. This results in improvement of $M^{[1/2(1-J)]}$, a factor of 4 for J=2

While the system in FIG. 8 is immediate for any number of simultaneously requesting end units, the system of FIG. 9 allows only a single access per trial. Each trial requires J−1 interim retransmissions from the node. Thus larger dial tone delay will ensue. The node transmits random dialing sequences to all the end units EU1 to EUN to ensure likelihood of access for all.

FIG. 10 illustrates an initial and fine synchronization time charts with 10 updates per second. Upwardly directly arrows indicate upstream messages and downwardly directed arrows indicate downstream messages. In the acquisition slot ASL superframe sync codes are sent downstream at time T1 and detected and time T2. An end unit delay preset, based on inaccurate prior knowledge of the node to end unit distance of 4 symbols per kilometer results. An access request code for initial synch is sent upstream at time $T_3$ and detected at time $T_4$. A nominal epoch ε of detection of the access request code occurs before the time $T_4$ and an actual epoch τ of detection of the access request code occurs at time $T_4$ within the next superframe. The node then transmits a housekeeping message downstream in a box at time $T_5$ which is detected downstream at the end unit time $T_6$. At a time $T_7$ the node transmits a downstream message $\epsilon_\tau$ in a drawer at time $T_7$. The latter is decoded and corrected by the end unit. At the time $T_9$ a corrected housekeeping slice for fine synchronization passes to the node at the actual epoch $T_{10}$ after a nominal epoch. The initial synchronization ends between the times $T_8$ and $T_9$ and the fine synchronization starts at that point. Following the initial synchronization, obtained from the access request code, the residual timing uncertainty is reduced to the order of one symbol. If access is granted, the HKA message sent by the Node NO2 allocates a specific slice in a fine synchronizing sequence with at least 4 bits of guard-time so as not to overflow the slice. This is the sync portion of synch sequence in FIG. 5. The node then estimates the timing error and sends it downstream in the allocated drawer in the timing (error) traffic allocation as a timing-error message as shown in FIG. 6. During the rest of the session, these S/ . . . and T/ . . . , synchronization and timing error messages will be transmitted whenever the respective drawer and slice are not used for housekeeping messages.

The invention replaces the tree structure of a local cable medium by a virtual star with dedicated virtual circuits for each end unit so as to be able to transfer contents of local registers to their respective counterparts at the node. The invention provides a shared medium with multiple access. It overcomes power losses from attenuation and coupling with suitable amplification and overcomes the disadvantages of the upstream channel being ten to fifteen db noisier than the downstream channel. It equalizes distortions and provides delay stability. It furnishes maximum aggregate throughput while maintaining continuity requirement of stream traffic with but a small delay for speech. It accommodates batch traffic of well specified duration which allows for delays and interruptions, as well as for streams of indefinite duration which places limits on delays and does not allow interruptions. Voice is delayed by less than five milliseconds.

The invention provides for multiple access. It overcomes the context of the local access cable for upstream traffic; namely "networking" problems and a "communication" problem. The networking problem concerns the function of a node as a network element connecting the end units to the rest of the world. For this purpose the system determines how many end units to allow to conduct sessions under statistical multiplexing, how to apply priorities to traffic types and/or different end units, how much time-bandwidth resource to allow each end unit and whether to reformat data from the end units before transfer further up the network. It defines the duration of a session to start with a specific request of an end unit for service and to terminate when the end unit decides (or is forced by the node) to do so. The system overcomes the "communication" problem by transforming the physical tree of the local access cable into a virtual star; that is into one-hop end unit to node virtual circuits, as in FIG. 2.

The system operates within the delay stability, produce at a temperature difference of $\Delta T=60°$ centigrade which causes a $10^{31}$ fractional dilation/contraction. This is of the same order of magnitude as the fractional symbol length at 10 Mb/s signaling rate. The system uses, or use a delay-lock loop to track the delay variations.

In this context stream traffic is defined as all traffic that has no specified duration and allows for no interruptions in its flow. This is predominately voice but also, as far as is presently known, video for moving scenes as well as interactive games. A further property of stream traffic is that it is highly intermittent and the system exploits this opportunity for statistical multiplexing. All other traffic is defined as batch-type. This latter is qualified by having a well-defined size, or duration, and allowing delays and interruptions, if needed. The allowable delays for video and interactive games is still open and requires specification.

Delay-tracking as performed by the system also serves as a built-in test equipment (BITE) which has an important supervisory role. It allows instant location of a malfunction of some end-user timing function, which could interfere with other end users. The system transfers the contents of the local registers to the respective counterparts at the node despite the upstream channel being substantially noisier than the downstream channel. The node uses the downstream channel for network control. It achieves maximum aggregate throughput while maintaining continuity requirement of stream traffic and small delays for speech and other stream traffic with a low dial tone delay. The system accesses the multi-user tree structure and efficiently uses all the time× bandwidth product at the node input, i.e., the rest of the tree with special care to allow for uninterrupted flow of STREAM type traffic. It maintains synchronization of the end units such that their symbols arrive well-timed to node. It capitalizes on the intermittency of STREAM type traffic to increase the efficient use of the channel resources.

The system uses an acquisition-reservation technique for multiple access. As shown in FIG. 4, an acquisition slot AS1 is available at the beginning of each superframe. An idle end unit has the opportunity to use the acquisition slot, when it has a message to transmit, to apply for transition to the active state. If acquisition is unsuccessful, the end unit may try again in the acquisition slots of subsequent superframes. Once an active state has been achieved, the end unit will not use the acquisition slots over the whole duration of the session. The duration of the session depends, of course, on the number of superframes needed to transmit all the data in the end unit's message. Under normal loading conditions, the node need not often exercise its prerogative to abort an ongoing session because of priority considerations in the resource allocation policy.

The centrally supervised arrangement ensures that when the number of end units asking for service is smaller than the maximum number allowed, they are allocated all channel resources so as to end their transmission sooner. This maintains maximum aggregate throughput, even 100%. This is important with a mix of time varying traffic rates.

This system according to the invention distinguishes between stream traffic and other traffic because stream traffic is more delicate, in particular for voice. No interruptions are allowed and short delays are required. Stream traffic when temporarily not generating data has a higher probability of resuming generation than an idle end unit would start generation. This system maintains contact with end units carrying stream traffic with the node during short intermittent speech intervals.

The system uses the node processor PR1 to supervise the synchronization of time division multiplexed access timing even when the end units are not effectively generating data in order to allow immediate resumption of transmission without overlap of symbols from different end units.

The acquisition-reservation system of the invention utilizes time division multiple access (TDMA) which can be exercised in traffic field because TDMA is optimum synchronization for well-timed arrival at the node is available. The centralized supervised TDMA can achieve nearly 100% aggregate throughput in traffic even for a mix of time varying rates. The system furnishes fast central control for resource allocation. The system furnishes acquisition with non-colliding CDMA or RAMA and includes initial synchronization. It furnishes network control with node supervised TDMA, symbol synchronized with half duplex housekeeping link arrangements. It furnishes three state-access, idle, active and online. Shared control decreases the housekeeping link overload. The node determines which active end unit is allowed online (low-speed function), and the active end unit decides when to give and resume online status (high-speed function with fast allocation update). The system provides non-colliding acquisition with a dial tone delay much less than one second. The node supervised TDMA takes care of a mix of time-varying traffic rates with full advantage of the voice activity factor. It prevents interruption in stream type traffic such as speech, video, and interactive games. The delay for voice is a few milliseconds. There are hundreds of thousands of resource allocation updates. The total overhead including synchronization is but a small percentage. It is adaptable to other shared media applications such as wireless asynchronous transfer mode (ATM) local area network (LAN).

The wireless local area network (LAN) connectivity can also be envisaged as an inverted tree in which all end branches grow from the root but are tied together physically at the receiving antennae.

In summary, the invention overcomes the effect of the upstream channel being considerably noisier than the downstream channel and therefore allowing a smaller transmission rate. The acquisition/reservation type multiple access regime enables close to 100% aggregate throughput for any traffic at arbitrarily time-varying rates. The orthogonal codewords acquisition is immediate and simultaneously enables initial synchronization. The definition of three-states of the end units with the shared node end unit allows instant per frame allocation of transmission resources and negligible housekeeping overhead. The resource auction multiple access RAMA and orthogonal codeword acquisition are closely related.

While embodiments of the invention have been described in detail it will be evident to those skilled in the art that the invention may be embodied otherwise without departing from its spirit and scope.

What is claimed is:

1. A communication system, comprising:

a network having a plurality of nodes;

a plurality of end units each connected to one of said nodes;

means in each of said end units for assuming one of an idle, active, or on-line state and for requesting a node to which one of said end units is connected to change from the idle to the active and the active to the on-line state, and for releasing the on-line state on the basis of data at the one end unit; and means in each of said nodes for changing the state of an end unit from the idle to the active and from the active to the on-line state on the basis of available communication time;

said node including means for transmitting and receiving data in time sectors, said time sectors each having an acquisition field for receiving acquisition requests and a traffic field for messages;

said end units directing requests for access to the on line state during the time of the acquisition field in the time sectors.

2. A system as in claim 1, wherein said nodes each connect directly to said end units in a star relation.

3. A system as in claim 1, wherein each of said nodes includes a traffic determining processor and a traffic-data-storing register, and each of said end units includes a state-changing processor a data-storing and transmitting register coupled to a node.

4. A system as in claim 1, wherein:

said time sectors have frames, and said node includes means for assigning the same frame in each sector to an end unit when said node places said end unit in the on-line state.

5. A system as in claim 1, wherein said means in said node includes means for changing the state of an end unit to give preference to predetermined types of traffic.

6. A system as in claim 1, wherein said means in said node includes means for changing the state of an end unit to give preference to stream traffic over batch traffic.

7. A communication method, comprising:

directing communication traffic along a network to a plurality of nodes;

directing the traffic from each node to a plurality of end units each connected to said nodes;

requesting access to traffic with an end unit by assuming one of an idle, active, or on-line state and requesting a node to which it is connected to change from the idle to the active and the active to the on-line state, and for releasing the on-line state on the basis of data at the end unit;

in said nodes changing the state of an end unit from the idle to the active and from the active to the on-line state on the basis of available communication time;

directing traffic in said node includes transmitting and receiving data in time sectors, said time sectors each having an acquisition field for receiving acquisition requests and a traffic field for messages; and in said end units directing requests for access to the on line state during the time of the acquisition field in the time sectors.

8. A method as in claim 7, wherein the step of directing traffic from said nodes to said end units includes communicating with said end units directly in a star relation.

9. A communication method as in claim 7, wherein the step of directing traffic by said nodes including determining the traffic with a processor and storing traffic data in a register in the node, and in each of said end units storing data for transmission to the node in a register and changing states with a processor.

10. A method as in claim 7, wherein:

said time sectors have frames, and said directing step in said node includes the step of assigning the same frame in each sector to an end unit when said node places said end unit in the on-line state.

11. A method as in claim 7, wherein said step in said node of changing the state of an end unit includes giving preference to predetermined types of traffic.

12. A method as in claim 7, wherein said step in said node for changing the state of an end unit includes giving preference to stream traffic over batch traffic.

13. A local access cable arrangement, comprising:

a network having a plurality of nodes;

a plurality of end units each connected to one of said nodes;

means in each of said end units for assuming one of an idle, active, or on-line state and for requesting a node to which one of said end units is connected to change from the idle to the active and the active to the on-line state, and for releasing the on-line state on the basis of data at the one end unit; and means in each of said nodes for changing the state of an end unit from the idle to the active and from the active to the on-line state on the basis of available communication time;

said node including means for transmitting and receiving data in time sectors, said time sectors each having an acquisition field for receiving acquisition requests and a traffic field for messages;

said end units directing requests for access to the on line state during the time of the acquisition field in the time sectors.

14. An arrangement as in claim 13, wherein said nodes each connect directly to said end units in a star relation.

15. An arrangement as in claim 13, wherein each of said nodes includes a traffic determining processor and a traffic-data-storing register, and each of said end units includes a state-changing processor a data-storing and transmitting register coupled to a node.

16. An arrangement as in claim 13, wherein:

said time sectors have frames, and said node includes means for assigning the same frame in each sector to an end unit when said node places said end unit in the on-line state.

17. An arrangement as in claim 13, wherein said means in said node includes means for changing the state of an end unit to give preference to predetermined types of traffic.

18. An arrangement as in claim 13, wherein said means in said node includes means for changing the state of an end unit to give preference to stream traffic over batch traffic.

* * * * *